United States Patent [19]
Gilbert et al.

[11] Patent Number: 5,122,884
[45] Date of Patent: Jun. 16, 1992

[54] LINE RASTERIZATION TECHNIQUE FOR A NON-GRAY SCALE ANTI-ALIASING METHOD FOR LASER PRINTERS

[75] Inventors: John M. Gilbert, Minneapolis; Lawrence J. Luckis; Leonard R. Steidel, both of Prior Lake, all of Minn.

[73] Assignee: LaserMaster Corporation, Eden Prairie, Minn.

[21] Appl. No.: 612,686

[22] Filed: Nov. 14, 1990

Related U.S. Application Data

[63] Continuation-in-part of Ser. No. 434,318, Nov. 10, 1989, Pat. No. 5,041,848.

[51] Int. Cl.⁵ .................................... H04N 1/21
[52] U.S. Cl. ................................. 358/298; 346/108
[58] Field of Search ............... 346/107 R, 108, 160, 346/1.1; 358/136, 296, 302, 300, 298

[56] References Cited

U.S. PATENT DOCUMENTS

| | | |
|---|---|---|
| 4,079,367 | 3/1978 | Yonezawa et al. . |
| 4,119,956 | 10/1978 | Murray . |
| 4,232,343 | 11/1980 | Sommer . |
| 4,482,893 | 11/1984 | Edelson . |
| 4,591,897 | 5/1986 | Edelson . |
| 4,593,278 | 6/1986 | Koos, Jr. et al. . |
| 4,630,947 | 12/1986 | Yoshida et al. . |
| 4,674,059 | 6/1987 | Schrieber . |
| 4,679,039 | 7/1987 | Neil et al. . |
| 4,680,645 | 7/1987 | Dispoto et al. . |
| 4,682,189 | 7/1987 | Purdy et al. . |
| 4,704,605 | 11/1987 | Edelson . |
| 4,710,764 | 12/1987 | Van Cang . |
| 4,736,310 | 4/1988 | Colthorpe et al. . |
| 4,770,552 | 9/1988 | Nishijima et al. . |
| 4,780,711 | 10/1988 | Doumas . |
| 4,785,391 | 11/1988 | Apley et al. . |
| 4,794,405 | 12/1988 | Kennedy, Jr. . |
| 4,796,020 | 1/1989 | Budrikis et al. . |
| 4,811,245 | 3/1989 | Bunker et al. . |
| 4,811,409 | 5/1989 | Cavan . |
| 4,816,817 | 3/1989 | Herrington . |
| 4,817,172 | 3/1989 | Cho . |
| 4,819,185 | 4/1989 | Corona et al. . |
| 4,827,352 | 5/1989 | Yoneda et al. . |
| 4,841,377 | 6/1989 | Hiratsuka et al. . |
| 4,843,380 | 6/1989 | Oakley et al. . |
| 4,849,910 | 7/1989 | Jacobs et al. . |
| 4,881,069 | 11/1989 | Kameda et al. . |
| 4,905,166 | 2/1990 | Schuerman . |
| 4,908,780 | 3/1990 | Priem et al. . |
| 4,933,866 | 6/1990 | Markoff et al. . |
| 4,959,801 | 9/1990 | Arley et al. . |

OTHER PUBLICATIONS

Automatic Generation of Digital Typographic Images From Outline Masters; Phillip G. Apley; Bitstream, nc.
Character Generation Under Grid Constraints; Hersch, Roger D; Computer Graphics, vol. 21, No. 4, Jul. 1987.
Intelligent Front Scaling and a Universal Format for Communication of Font Data; Jutzi, Curtis; Tektronix, Inc.

*Primary Examiner*—Mark J. Reinhart
*Attorney, Agent, or Firm*—Patterson & Keough

[57] ABSTRACT

A line rasterization technique for a non-gray scale anti-aliasing method smoothes the edges of a single pixel width line image to be printed by a binary imaging printer. The line image is generated by rasterizing an ideal line image as a plurality of raster lines to form a pixel representation of the line image to be communicated to the binary imaging printer. For each vertical transition point created by the ideal line image crossing two adjacent raster lines, the present invention smooths the line image by selectively modifying the on and off states of one or more pixels in an adjacent raster line on either side of the vertical transition point. The pixel representation of the line image is then communicated to the printer such that the printer may print the smoothed line image.

11 Claims, 7 Drawing Sheets

Fig. 3

Prior Art:

- let y = ys

- let x = xs

- calculate slope = b / a

- repeat following steps a times:

- let ry = y rounded or truncated to the nearest integer

- set pixel (x, ry)

- increment x

- add slope to y

Fig. 4

Present invention:

- let y = ys

- let x = xs

- calculate slope = b / a

- let error = 0

- repeat following steps a times:

- let yf = fractional part of y

- optionally, adjust yf by look up table

- add yf to error

- let yi = integer part of y

- if error is greater 1

- set pixel (x, yi+1)

- subtract 1 from error

- otherwise

- set pixel (x,yi)

- optionally, let yr = nearest integer to y and set pixel (x,yr)

- increment x

- add slope to y

LINE RASTERIZATION TECHNIQUE FOR A NON-GRAY SCALE ANTI-ALIASING METHOD FOR LASER PRINTERS

RELATED APPLICATION

This application is a continuation-in-part of an application by the same inventors and assigned to the same assignee as the present invention entitled NON-GRAY SCALE ANTI-ALIASING METHOD FOR LASER PRINTERS, Ser. No. 07/434,318, filed Nov. 10, 1989, and issued as U.S. Pat. No. 5,041,848 and an application by the same inventors and assigned to the same assignee as the present invention entitled DUTY CYCLE TECHNIQUE FOR A NON-GRAY SCALE ANTI-ALIASING METHOD FOR LASER PRINTERS, Ser. No. 07/591,537, filed Oct. 2, 1990, both of which are hereby incorporated be reference.

TECHNICAL FIELD

This invention pertains to methods of rasterization and fill techniques used to create images for binary imaging devices, such as laser printers. More particularly, this invention pertains to a line rasterization technique for a non-gray scale anti-aliasing method for smoothing the edges of a line image to be produced by a laser printer.

BACKGROUND ART

In recent years, the use of smaller, inexpensive laser printers with personal computers has created an entirely new industry referred to as desktop publishing. Desktop publishing systems offer users the ability to format and print documents having complicated layouts using characters that have a variety of different fonts and type sizes. While desktop publishing systems represent a significant advance in the art of publishing, the standard resolution of the laser printers used with such systems (typically a 300 × 300 dots per inch (dpi) Canon CX or SX-based laser printer, e.g. a Hewlett Packard LaserJet Series II printer) was too poor to compete with traditional phototypesetting systems.

In an effort to improve the quality and speed of the smaller, inexpensive laser printers used with desktop publishing systems, a variety of printer controller cards have been introduced that may be installed either in the laser printer or in the personal computer. Certain of the printer controller cards that are installed directly in the personal computer increase the quality and speed of the laser printers by using a separate co-processor and page frame buffer to create a pixel representation of the image to be printed on the laser printer. This image is then printed from the pixel representation in the page frame buffer by directly controlling the modulation of the laser in the print-engine of the laser printer. An example of such a printer control card is the LX6 Professional printer controller cards available from Laser-Master Corporation, Eden Prairie, Minn., the assignee of the present invention.

In some of the prior art printer controller cards, such as the LX6 Professional, it is possible to increase the horizontal resolution of the laser printer by controlling the modulation of the laser in the print-engine of the laser printer. By doing so, the LX6 Professional printer controller cards can increase the horizontal component of the pixel resolution of the laser printer to 600 × 300 dpi or 1000 × 400 dpi, depending upon the type of laser printer. This increase in horizontal resolution significantly improves the quality of the resulting printed image, particularly for pixel transition points along the outline edges of a character or image that occur in the vertical or near vertical orientation. Unfortunately, the increased horizontal resolution does little to improve the quality of the outline edges of a character or image that are near horizontal in slope.

The noticeability and appearance of such vertical pixel transition points is typically referred to as aliasing that results in jagged or stairstep edges of the character or image outline oriented generally in the horizontal direction. Traditionally, anti-aliasing techniques incorporating a gray-scale approach have been used in video displays to resolve this type of problem. Unfortunately, laser printers are binary imaging devices and are not capable of implementing such gray-scale techniques. In larger and more expensive laser printers, the problems associated with aliasing and non-smooth edges may be resolved by using higher pixel resolutions in these printers. In the smaller, inexpensive laser printers used, for example, with desktop publishing systems, this approach is not used because of the associated increase in cost.

In accordance with the parent application of the present invention, a non-gray scale anti-aliasing method for smoothing the horizontal components of the edges of an image to be printed by a laser printer having unequal pixel resolutions in the horizontal and vertical dimensions is described. The method was specifically described for use by a processor that is provided with an ideal outline of the image and then rasterizes the ideal outline of the image using the processor for determining which pixels to turn on and which pixels to turn off in a frame buffer that stores a pixel representation of the image to be printed by the laser printer. The smoothing is accomplished by selectively modifying the on and off states of pixels on either side of each vertical transition point along the horizontal components of raster lines representing the edges of the pixel representation of the image.

It will be recognized that the pixel representation created in the frame buffer for each horizontal raster line is used to control the laser in the laser printer. When the laser is turned on in response to an "on" pixel, a generally circular laser beam image is reflected on the print drum of the print engine to transfer charge elements to the drum. The charge elements attract and pick up toner that is then transferred to a sheet of paper. Although the pixel elements are thought of as square or rectangular shapes, in actuality, the edges of the pixels typically bleed into one another.

In essence, the parent application for the present invention taught that the vertical transition points in the horizontal raster lines could be smoothed by selectively adding and subtracting pixels around the transition points. In the preferred embodiment of the parent application, the smoothing of the horizontal components of the edges of the ideal outline is accomplished during the rasterization fill process for each horizontal raster line. As each line is rasterized, the processor accumulates a running fill value that represents the area of each pixel inside the ideal outline that should be turned "on" or filled. If the processor determines that the area of the fill value is greater than the area of a pixel, the pixel presently being processed is turned "on" and the area of a pixel is substracted from the fill value. In this embodiment, the fill value acts like a running accumulator with the carry out of the accumulator being used to determine whether the pixel presently being processed should be turned "on".

The second parent application of the present taught that this non-gray scale anti-aliasing method could be generalized and adapted to a wide variety of laser printers having different sizes, shapes and power densities associated with their laser beam spot images. Using the generalized approach, the smoothing of the edges of the ideal outline is accomplished by comparing the ideal fill area to at least a first and second comparison value. Based upon the comparison of the ideal fill area and the first and second comparison values, a determination is made as to whether the pixel currently being processed will be turned on or turned off.

Although these non-gray scale anti-aliasing techniques provide an effective mechanism for smoothing the edges of outline images, it has been discovered that these techniques are not as effective in smoothing line images, particularly obliquely angled lines and curves, and especially lines and curves that have shallow aspect angles from the horizontal. One of the reasons that these types of line images present a problem is because the ideal line image does not have any width. This lack of width results in the absence of an outlined fill area to use in determining which pixels to turn on and which pixels to turn off.

Higher resolution printer and display systems resolve this situation by using the Bresenham technique, for example, to trace a brush stroke along the path of the ideal line image. The brush stroke is typically a geometric shape having a diameter (in terms of numbers of pixels) equal to that of the desired width of the line. U.S. Pat. Nos. 4,819,185 and 4,849,910 demonstrate the application of variations of this technique in higher resolution laser printers. Unfortunately, the Bresenham technique is useful only in those situtations where the dimensions of the pixels in the printer are smaller than the smallest desired line width.

If the smallest line width is approximately equal to or less than the pixel dimensions of a given binary imaging device, then an ideal line image of that width or less must be represented by a sequence of single pixels turned on along the path of the ideal line image. A line of this width will be drawn by determining the initial coordinates of the line in the pixel frame buffer and then turning on one pixel at a time in the direction of the ideal line image. This has been the prior art technique utilized by most of the laser printers associated with desktop publishing systems, for example. Unfortunately, when the slope of the ideal line image crosses from one horizontal raster line to the next adjacent raster line, an abrupt vertical transition point occurs between the two raster lines. This abrupt transition point creates the familiar problem of printing jagged or stair-stepped images, rather than the smooth and uniformly thick line images that are desired.

While non-gray scale anti-aliasing techniques of the parent applications have taught a method for smoothing the edges of jagged images, these techniques are not generally applicable to line images because of the lack of an ideal outline image. Accordingly, it would be desirable to provide for a line rasterization technique that would allow the non-gray scale anti-aliasing technique of the parent applications to be extended to smooth lines images to be printed on a laser printer, especially where the line width is approximately equal to or less than the pixel dimensions of the laser printer.

SUMMARY OF THE INVENTION

The present invention is a line rasterization technique for a non-gray scale anti-aliasing method for smoothing the edges of a single pixel width line image to be printed by a binary imaging printer. The line image is generated by rasterizing an ideal line image using a processor means for processing a plurality of raster lines to form a pixel representation of the line image to be communicated to the binary imaging printer. For each vertical transition point created by the ideal line image crossing two adjacent raster lines, the present invention smooths the line image by selectively modifying the on and off states of one or more pixels in an adjacent raster line on either side of the vertical transition point. The pixel representation of the line image is then communicated to the printer such that the printer may print the smoothed line image.

The method of rasterizing the line image is accomplished by determining an error height for each pixel in the raster line currently being processed that represents the height of the ideal line image as compared with the height of a preselected reference point. In the preferred embodiment, the preselected reference point is the center line of the raster line currently being processed. The error height is added to an accumulated error value and a determination is made as to whether to turn on the pixel currently being processed. If the accumulated error value is less than a predefined threshold, then the pixel is turned on. If, on the other hand, the accumulated error value is greater than or equal to predefined threshold, then the pixel currently being processed is not turned on and a corresponding pixel in the adjacent raster line is turned on instead and the accumulated error value is reset. In the preferred embodiment, the predefined comparison value is the total pixel height of a pixel and the accumulated error value is reset by subtracting the total height of a pixel from the error value.

By selectively modifying the on and off states of pixels in two adjacent raster lines about a vertical transition point, the stair-step or jagged effect that occurs in the present line rasterization technique is effectively smoothed using a non-gray scale antialiasing technique similar to that of the parent applications of the present invention. This allows the smoothing to be accomplished for the edges of single pixel width line images, in addition to the edges of ideal outline image.

Several variations of the invention are also presented, including a pre-rasterization test of the angle of the line being rasterized to determine how best to rasterize the single pixel width line, the use of a duty cycle technique to selectively modify the pixel about the vertical transition point to accommodate different types of laser printers having different size, shapes and power densities of spot images, and requiring the selective modification of the pixels about the vertical transition to occur as pairs or multiple pixel modification, rather than a single pixel.

A primary objective of the present invention is to provide new techniques for adapting the non-gray scale anti-aliasing method of the parent applications to the rasterization of single pixel width line images.

An additional objective of the present invention is to provide a new line rasterization technique that eliminates the stair-step transitions between adjacent raster lines.

Another objective of the present invention is to provide a line rasterization technique for a non-gray scale anti-aliasing method that is especially adapted for laser printers having unequal resolutions in the horizontal and vertical dimensions.

Still another objective of the present invention is to implement the smoothing method of the present invention during the fill process of the rasterization of the pixel representation of a line image without requiring any post-rasterization processing or circuitry to accomplish the smoothing of the line images.

These and other objectives of the present invention will become apparent with reference to the drawings, the detailed description of the preferred embodiment and the appended claims.

DESCRIPTION OF THE DRAWINGS

FIG. 3 is a flow chart of the prior art rasterization method for single pixel width lines.

FIGS. 4a and 4b are flow charts of the line rasterization technique in accordance with the preferred embodiment of the present invention

DESCRIPTION OF THE PREFERRED EMBODIMENTS

Figure 2A:
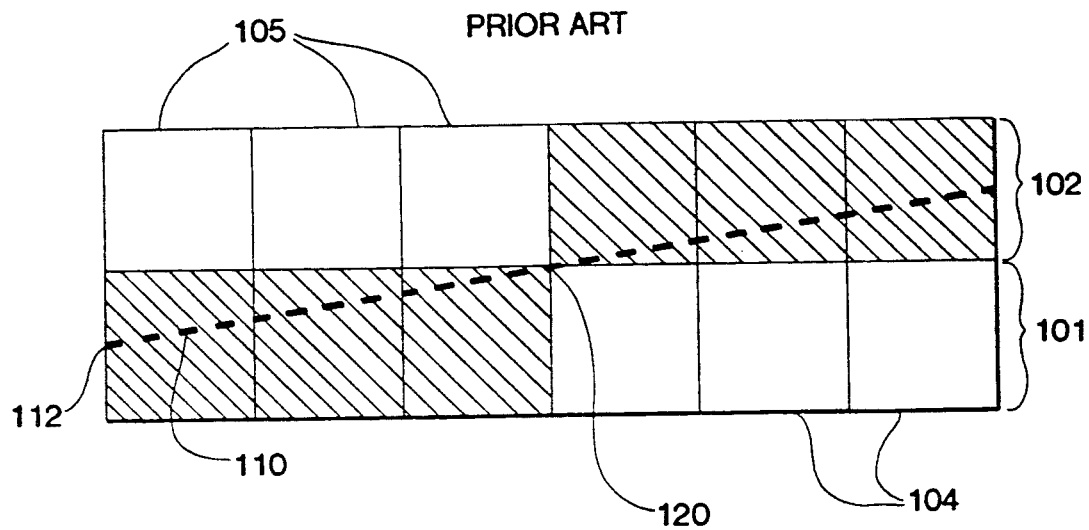
FIGS. 2a, 2b and 2c are schematic pixel representations of a two adjacent raster lines representing a portion of a single pixel width line as rasterized by the prior art and by the method of the present invention.
Figure 2B:
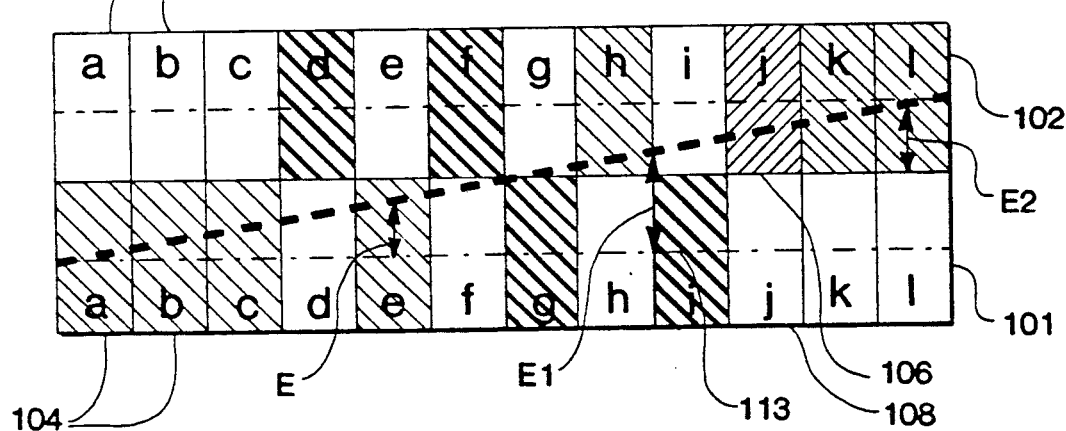
Figure 2C:
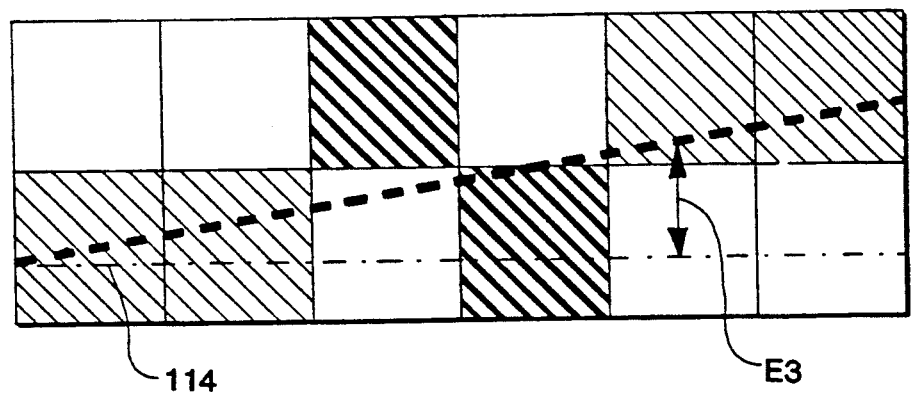

Referring to FIGS. 2a-2c, the differences between the prior art method of rasterizing a single pixel width line and the line rasterization technique of the present invention will be described. For purposes of describing the present invention, reference will be made to the horizontal and vertical resolutions of a binary imaging printer, or to the horizontal and vertical dimensions of a pixel to be printed by the binary imaging printer. The designation of the orientation of horizontal and vertical is arbitrary and refers, by convention, to the orientation of a raster line with respect to the top of a sheet of paper on which the images will be printed by the binary imaging printer. It should be noted that the present invention is equally applicable to both horizontal and vertical lines. Throughout the present invention, the terms horizontal and vertical will refer to the directions in which the line image will be rasterized (horizontal) and the direction in which the error from an ideal line image will be measured (vertical).

In FIGS. 2a-2c, a portion of two adjacent horizontal raster lines 101 and 102 are shown. Each raster line 101 and 102 is comprised of a plurality of pixels 104 and 105, respectively. In the prior art representation shown in FIG. 2a, the pixels 104 and 105 are shown as square pixel of equal vertical and horizontal dimensions. In the preferred embodiment of the present invention as shown in FIG. 2b, the pixels 104 and 105 are rectangular and have unequal vertical and horizontal dimensions in accordance with the preferred embodiment of the non-gray scale anti-aliasing method described hereinafter.

An ideal line image 110 (shown for reference as a dashed line) has an initial coordinate 112 and extents (dimensions) in both the horizontal (x) dimension and the vertical (y) dimension. In FIG. 2a, the ideal line image 110 has an x extent of 6 and a y extent of 1, resulting in a slope of 1/6 for the line. It will be recognized that in place of the extents that define the ideal line image 110 in the preferred embodiment, either a slope of the line or an end coordinate for the line may also be used to define the ideal line image 110. The ideal line image 110 may also be defined as a vector. In addition, nothing in the present invention is meant to limit the line to a straight line. The present invention can work equally as well with shallow curves, or larger curves made up of multiple line segments.

In the prior art as shown in FIG. 2a, the decision on whether to turn on or turn off a particular pixel to represent a single width pixel line is based solely on whether the ideal line image intersects the pixel. If the ideal line image intersects the pixel, then the pixel is on; if not, then the pixel is off. A typical method in the prior art for accomplishing the rasterization of a single pixel width line is shown in the flow chart represented by FIG. 3. The key is that the y pixel coordinate for the pixel currently being processed is either truncated or rounded to the nearest integer, resulting in the step-like change between the adjacent raster lines 101 and 102 that occurs at the transition point 120 where the ideal line image 110 intersects the common boundary 106 between the adjacent raster lines 101 and 102.

In contrast to the step-like change of the prior art as shown in FIG. 2a, the present invention selectively modifies certain of the pixels 104 and 105 around the transition point 120 to produce a smoothing of the edges of the line image. The pixels 104 and 105 modified as compared to the prior art method single pixel width line rasterization are shown in cross hatch. In the embodiment shown in FIG. 2b, the pixels 104 and 105 have unequal horizontal and vertical dimensions generated by the increased modulation of the laser in the laser printer as described in greater detail hereinafter. While the smoothing effect produced by the present invention may be more pronounced in some binary imaging printers with pixels having unequal horizontal and vertical dimensions, it should be recognized that the method of the present invention is equally applicable to binary imaging printers having equal horizontal and vertical resolutions, as shown, for example, in FIG. 2c. It is believed that the reason for the smoothing of the edges of the line image in either case is the result of the partial buildup of toner charge on the drum of the laser in response to the changes in the toner deposit function caused by the selective modification of these pixels as described in more detail in the parent application entitled DUTY CYCLE TECHNIQUE FOR A NON-GRAY SCALE ANTI-ALIASING METHOD FOR LASER PRINTERS.

In the embodiment shown in FIG. 2b, an error height E is generated by comparing the height of the ideal line image 110 with the height of the center line 107 of the raster lines 101 currently being processed. In this embodiment, the error height E is determined with respect to the height of the ideal line image 110 at the center of the pixel 104 currently being processed. In theory, for a single pixel width line, the optimum placement of the ideal line image 110 with respect to the pixel 104 should be along the center line 107; therefore, this embodiment uses the center line 107 to determine the error height E. It will be recognized, however, that many different ways of determining the error height E could be utilized to achieve the smoothing results of the present invention. For example, an error height $E^1$ is determined based upon a comparison of the intersection of the ideal line image 110 with the center line 107 at either the left or right edge of the pixel 104. Alternatively, an error height $E^2$ is determined based upon a comparison of the ideal line image 110 with the top or boundary line 106 or bottom 108 of the raster line 101. Still another alternate method of determining an error height $E_3$, as shown in FIG. 2c, is to base the error height upon a comparison of the ideal line image 110 with an origin line 114 representing a horizontal line parallel to the initial vertical coordinate or the initial coordinates 112.

In the preferred embodiment as shown in FIG. 2b, once the error height E is determined for the pixel 104 currently being processed in raster line 101, the error height E is added to an accumulated error value and the pixel 104 is turned on. If the accumulated error value exceeds a preselected threshold value, then the pixel 104 currently being processed is not turned on. Instead, the corresponding pixel 105 in the adjacent raster line 102 is turned on. In this way, the accumulated error value acts as a smoothing window around the vertical transition 120 in which the pixels 104 and 105 of the adjacent raster lines 101 and 102 will be selectively modified (either on or off) as compared to the prior art rasterization techniques for single pixel width lines. In the preferred embodiment, the preselected threshold is set at the vertical height of the pixels 104 and 105, although it will be recognized that many other values for the preselected threshold could be used and still be within the scope of the present invention.

To understand how the preferred embodiment would rasterize a given ideal line image, consider the ideal line image 110 in FIG. 2b. At pixel 104d of raster line 101, the accumulated error value representing the accumulation of the error height E for pixels 104a, 104b, 104c and 104cd exceeds the value of the vertical height of the pixel 104. Therefore, the pixel 104d in raster line 101 is not turned on and the pixel 105d in raster line 102 is turned on. The accumulated error value is reset by subtracting the vertical height of the pixel (in this case, still leaving a residual fractional value in the accumulated error value because the previous accumulated error value was greater than the vertical height of the pixel). This process is repeated with pixels 105f turned on instead of 104f.

In the preferred embodiment, the center line 113 of raster line 101 is used as the base for determining the error height E until the ideal line image 110 crosses the center line 114 for raster line 102. Consequently, pixels 104g and 104i are turned on in raster line 101 and pixel 105h, 105j and 105k are turned on in raster line 102. At pixel 105l, the ideal line image crosses the center line 114 and now the error height E will be calculated from this center line. In this manner, the rasterization of the ideal line image 110 efficiently moves from adjacent horizontal raster line to raster line without the need to examine the entirety of each raster line. An example of the programming steps used to implement the preferred method of the present invention is presented in connection with the description of FIGS. 4a and 4b set forth hereinafter.

Figure 1:
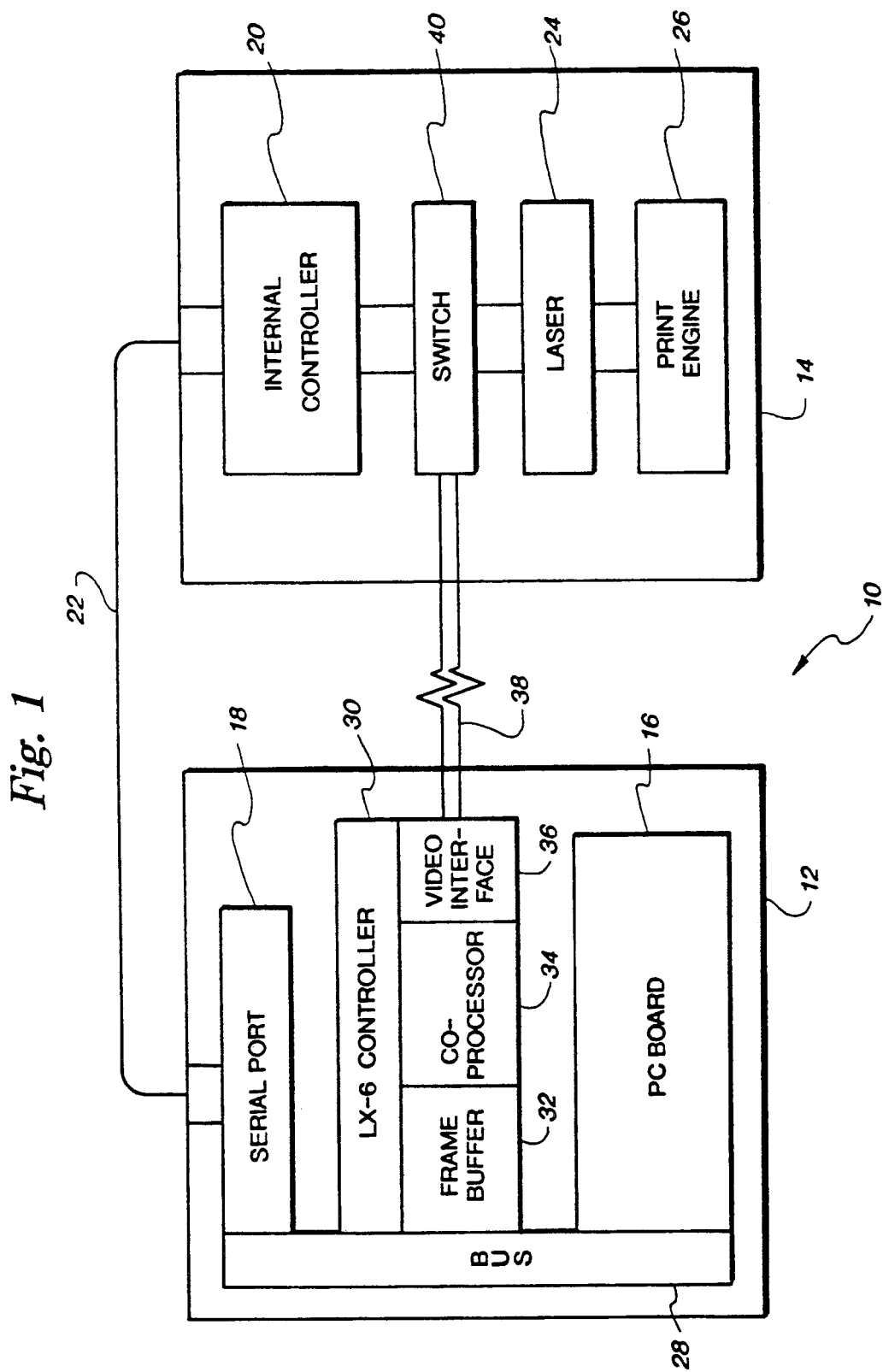
FIG. 1 is a block diagram of laser printing system having a printer controller card for generating an image to be printed by a laser printer having unequal resolutions in the horizontal and vertical dimensions.

Referring now to FIG. 1, a typical desktop publishing system 10 having the printer controller card that executes the software that comprises the preferred embodiment of the present invention will be described. The hardware for the desktop publishing system 10 is comprised of a personal computer 12 connected with a small, inexpensive laser printer 14. The personal computer 12 may be any one of a variety of personal computers such as an IBM PC, XT/AT, 386, or PS/2, available from International Business Machines, Armonk, N.Y., or an Apple Macintosh, available from Apple Computers, Inc., Cuppertino, Calif. The personal computer 12 may be provided with a desktop publishing software package, such as Ventura Publisher, available from Xerox Corporation, PageMaker, available from Aldus Corporation, or GEM Desktop Publisher, available from Digital Research, Inc. The laser printer 14 may be any type of Canon CX or SX laser printer such as the HP LaserJet Series II available from Hewlett Packard, the LaserWriter, available from Apple Computer, Inc., or the Canon LBP8-III, available from Canon Inc.

In normal operation without a printer controller card, the personal computer 12 includes a main PC mother board 16 and a serial port 18 through which the personal computer 12 communicates with the internal controller 20 of the laser printer 14. The computer 12 sends a serial bit stream to the laser printer 14 over an RS-232-C serial interface 22 in the form of various commands and data that represent the image to be printed by the laser printer 14. The internal controller 20 decodes the serial bit stream and generates the control signals that will be supplied to the laser 24 to drive the print engine 26 that creates the printed images corresponding to the various commands and data received by the internal controller. For a more detailed explanation of the internal operation of the laser printer 14, reference is made to the LaserJet II Printer User's Manual, Edition 1, available from Hewlett-Packard.

Because of the inherent limitations on the speed at which the commands and data can be transferred over the serial interface and decoded by the internal controller 20, the page throughput for the laser printer 14 is typically very low, 6 pages per minute or less depending upon the formatting and type of information being printed. To solve this problem and to simultaneously increase the quality and performance features of the laser printer, various printer controller cards 30 have been introduced into desktop publishing systems, such as the LX6 Professional, available from LaserMaster Corporation, Eden Prairie, Minn. The printer controller card 30 of the preferred embodiment is located in the personal computer 12 and communicates directly with the PC mother board 16 via an internal bus 28. It will be recognized, however, that the printer controller card 30 may be located in the laser printer 14 or that the present invention may be implemented within the internal controller 20 of the laser printer 14.

In the preferred embodiment, the printer controller card 30 is an LX6 Professional printer controller card selected to match the particular type of laser printer 14 being used in the desktop publishing system 10. The LX6 Professional controller consists of a frame buffer 32, a co-processor 34 and a video interface 36. The co-processor 34 receives the various commands and data representing the image to be printed from the PC mother board 16 via the bus 28. Because the bus 28 is a parallel bus, the transfer rate is much faster than for the serial port 18. The co-processor 34 decodes the commands and information and produces a mathematically pure ideal outline or line image corresponding to a filled polygon or single pixel width line image that will represent each image or character to be printed. The co-processor 34 may also aid the personal computer 12 in rendering lines, graphics and characters as determined by the particular application software package currently being run on the personal computer 12. In the preferred embodiment, the smoothing method of the present invention is applied by the co-processor 34 as it is generating each horizontal raster line 101, 102 to be stored in the frame buffer 32. Typically, the horizontal raster lines 101, 102 are processed from top to bottom in the frame buffer 32 and the pixels 104, 105 are processed from left to right, although it will be recognized that the raster lines 101, 102 and pixels 104, 105 may be processed in any direction so long as the processing is consistent throughout an entire page in the frame buffer 32.

Once the ideal outline or line image is generated, it is then filled in or "rasterized" to produce a pixel representation of the image to be printed that is stored in the memory of the frame buffer 34. Any number of known fill techniques or algorithms may be used to fill in the pixels inside the outline, depending upon how overlapping images are to be handled. The single pixel width line images are rasterized in accordance with the present invention. When the laser printer 14 is ready to print a page or "frame" worth of images, the pixel representation in the frame buffer 34 is transferred to the laser printer 14 via the video interface 36 in the printer controller 30 that communicates directly with the laser 24 via a video cable 38. An internal switch 40 in the laser printer 14 allows the printer controller 30 to override the internal controller 20 of the laser printer and directly modulate the laser 24. It is this direct modulation of the laser 24 that allows the printer controller 30 to increase the horizontal resolution of the laser printer 14. For a more detailed explanation of the operation of the LX6 Professional controller 30, reference is made to the LX User Guide, which is incorporated herein by reference and is available from LaserMaster Corporation.

Referring now to FIGS. 4a and 4b, the operation of the preferred embodiment of the present invention are shown in terms of a traditional programming flow chart. Those skilled in the art will best understand the description of these embodiments by reference to the flow charts for the detailed description of the operation of a sample version of a program coded in accordance with the present invention. Those skilled in the art will also recognize that there are many alternative ways of programming a processor to perform the smoothing of a single pixel width line image in accordance with the present invention, and the flow chart descriptions provided in FIGS. 4a and 4b are not meant to limit the scope of the present invention.

Figure 5A:
FIGS. 5a and 5b are schematic pixel representations (4× and 20× scales, respectively) of a shallow horizontal single pixel width line produced by the prior art.
Figure 5B:
Figure 6A:
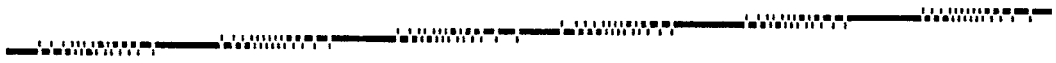
FIGS. 6a and 6b are schematic pixel representations (4× and 20× scales, respectively) of the same shallow horizontal single pixel width line as shown in FIGS. 5a and 5b with pixels selectively modified about each transition point using a replacement accumulator technique.
Figure 6B:
Figure 7A:
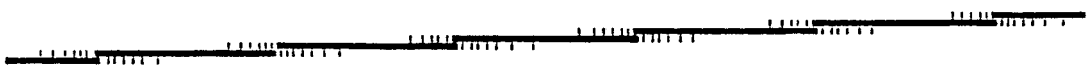
FIGS. 7a and 7b are similar to the schematic pixel representations of FIGS. 6a and 6b, only using an additive accumulator technique for selectively modifying the pixels representing the line image.
Figure 7B:
Figure 8A:
FIGS. 8a and 8b are similar to the schematic pixel representations of FIGS. 6a and 6b, only using a lookup table comparison technique for selectively modifying the pixels representing the line image.
Figure 8B:
Figure 9A:
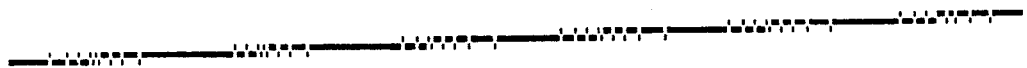
FIGS. 9a and 9b are similar to the schematic pixel representations of FIGS. 6a and 6b, only using an alternative lookup table comparison technique.
Figure 9B:
Figure 10A:
FIGS. 10a and 10b are similar to the schematic pixel representations of FIGS. 6a and 6b, except that a restriction prohibiting single pixel replacements is used in selectively modifying the pixels representing the line image.
Figure 10B:

FIGS. 5a and 5b are enlarged pixel representation showing the prior art method of line rasterization as applied to a single pixel width line. FIGS. 6a and 6b are enlarged pixel representation showing the results of the basic line rasterization technique of the present invention as applied to a single pixel width line. FIGS. 7a and 7b show the same single pixel width line as the basic line rasterization technique with the qualification that the selective modification operates only to turn on pixels in the adjacent raster line and none of the pixels in the raster line currently being processed are not turned on.

There are several variation to the basic process of accumulating the height error E to determine the rasterization for a single pixel width line image in accordance with the present invention.

One of the variations is to include a check for the angle or slope of the line to see if rasterizing the line using the present invention is the most efficient rasterization. In those instance where the angle of the line is at or near 45°, it will be recognized that for binary imaging printers having equal horizontal and vertical resolution, the optimum rasterization of such a single pixel width line will be a sequence single pixel "stair steps" in the direction of the ideal line image. It will also be recognized that if the angle of the line is too step with respect to the horizontal direction in which the pixels are being rasterized, then the smoothing effect of the present invention will not be realized to the same extent as it will on shallower lines. Accordingly, another embodiment of the present invention provides for a check of the slope of the ideal line image. If the slope is a less than 1 by some predefined range, then the ideal line image is processed in the horizontal direction in accordance with the present invention. If the slope is within the predefined range about 1, then the ideal line image is rasterized in the conventional manner. If the slope is greater than one by the predefined range, then the horizontal and vertical directions of processing the line are reversed and the line is processed horizontally as a "vertical" line.

Another variation is to use the duty cycle technique as described in the parent application entitled DUTY CYCLE TECHNIQUE FOR A NON-GRAY SCALE ANTI-ALIASING METHOD FOR LASER PRINTERS as an adjustment to the accumulation of the error height E. In one case, the error height E is compared to at least a first and second comparison value to establish a range within which a predetermined duty cycle will be applied to rasterize all of the pixels within this range. In another case, the error height E is used to access a lookup table containing adjustment values that are then used by an accumulator to produce the accumulated error value. The lookup table allows for finer resolution of the more general case of the duty cycle technique to compensate for a wide variety of print engines having different toner deposit functions in response to the duty cycle of the modulation signal applied to the print engine. FIGS. 8a and 8b and FIGS. 9a and 9b are enlarged pixel representations showing the results of the duty cycle/lookup table line rasterization technique of the present invention as applied to a single pixel width line. For a more detailed description of each of these variations, reference is made to the above-identified parent application.

Still another variation of the present invention is used to prevent the "disappearance" of single pixels, especially pixels having unequal horizontal and vertical resolutions due to the increased modulation of the laser in the print engine. In these situations, a single pixel may not always appear if printed by itself on a raster line without closely adjacent pixels. To compensate for this condition, the method of the present invention is modified to require that two adjacent pixels be turned on each time it is determined that a pixel in the window about the transition point should be selectively modified as compared to the conventional rasterization technique. One method for accomplishing this double pixel limitation is to require that the accumulated error value exceed a preselected value that is equal to twice the vertical pixel height and then turning on two pixels in a row before fully resetting the accumulated error value. It will be understood that in the event that the modulation of the laser in the laser printer was sufficiently fast enough to produce very narrow pixels having small horizontal resolutions, this variation could be used to require any number of multiple consecutive pixels for each determination that the line image should be smoothed in accordance with the present invention.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A method for rasterizing a single pixel width line image to be printed by a binary imaging printer having a specified horizontal and vertical resolution, comprising the steps of:
   providing a processor means with an ideal line image;
   rasterizing the ideal line image using the processor means to determine which pixels to turn on in a frame buffer memory means for storing a pixel representation of the image to be printed as a plurality of raster lines;
   for each vertical transition point created by the ideal line image crossing two adjacent raster lines, smoothing the line image by selectively modifying the on and off states of one or more pixels in an adjacent raster line on either side of the vertical transition point; and
   communicating the pixel representation stored in the frame buffer memory means to the printer such that the printer may print the smoothed line image.

2. The method of claim 1 wherein the step of smoothing the line image is accomplished by:
   for each pixel in the raster line currently being processed, determining an error height E for each pixel by comparing the height of the ideal line image with the height of a center line of the raster line currently being processed;
   adding the error height to an accumulated error value;
   if the accumulated error value is less than a predefined threshold, turning on the pixel; and
   if the accumulated error value is greater than or equal to predefined threshold, turning on a corresponding pixel in the adjacent raster line.

3. A non-gray scale anti-aliasing method for rasterizing a single pixel width line image to be printed by a binary imaging printer comprising the steps of:
   rasterizing an ideal representation of the line image using a processor means for processing a plurality of raster lines to form a pixel representation of the image to be communicated to the binary imaging printer; and
   for each pixel in a raster line where the ideal representation of the line image intersects the pixel currently being processed:
      accumulating an error value representing a fractional pixel error height of the ideal representation of the line image from an edge of the raster line for the pixel currently being processed;
      if the error value is less than a predefined comparison value, turning on the pixel currently being processed, otherwise turning on an associated pixel in a raster line adjacent to the raster line currently being processed and resetting the error value.

4. The method of claim 3 wherein the predefined comparison value is the total pixel height of a pixel.

5. The method of claim 3 wherein the step of resetting the error value is accomplished by subtracting the total height of a pixel from the error value.

6. A non-gray scale anti-aliasing method for rasterizing a single pixel width line image to be printed by a binary imaging printer comprising the steps of:
   rasterizing an ideal representation of the line image using a processor means for processing a plurality of raster lines to form a pixel representation of the image to be communicated to the binary imaging printer; and
   for each pixel in a raster line where the ideal representation of the line image intersects the pixel currently being processed:
      turning on the pixel currently being processed;
      accumulating an error value representing a fractional pixel error height of the ideal representation of the line image from an edge of the raster line for the pixel currently being processed;
      if the error value is greater than a predefined comparison value, turning on an associated pixel in a raster line adjacent to the raster line currently being processed and resetting the error value.

7. An improved method for smoothing a line image to be printed by a binary imaging printer, the line image being supplied by a processor means for rasterizing an ideal representation of the line image to determine which pixels to turn on and which pixels to turn off in a frame buffer memory means for storing a pixel representation of the line image as a plurality of raster lines to be communicated to and printed by the printer, the improvement comprising the step of:
   smoothing the pixel representation of the line image in the frame buffer memory means by selectively modifying the on and off states of one or more pixels on either side of each vertical transition point created by the ideal representation of the line image crossing two adjacent raster lines.

8. A method for smoothing an ideal line image to be printed by a binary imaging printer having a specified horizontal and vertical resolution, comprising the steps of:
   rasterizing the ideal line image using a processor to process a plurality of horizontal raster lines comprised of a plurality of pixels, each pixel having a given total area, to form a pixel representation of the line image in a frame buffer; and
   smoothing the horizontal components of the ideal line image by performing the following steps for each of pair of adjacent horizontal raster lines having a vertical transition point created by the ideal line image crossing two adjacent raster lines:

accumulating an error value representing a fractional pixel error height of the ideal line image from a predefined reference point for a plurality of pixels in the raster line;

determining if the error value is greater than a predefined comparison value; and if the error value is greater than the predefined comparison value, turning on a pixel in the adjacent raster line that is vertically adjacent to the pixel currently being processed and resetting the error value.

9. The method of claim 8 wherein the predefined comparison value is the total pixel height of a pixel.

10. The method of claim 8 wherein the step of resetting the error value is accomplished by subtracting the total height of a pixel from the error value.

11. The method of claim 8 further comprising the step of:

if the error value is greater than the predefined comparison value, turning off the pixel currently being processed before resetting the error value.

* * * * *